Oct. 28, 1958 G. V. TAPLIN 2,858,447
RADIATION DOSIMETER AND DOSIMETRIC METHODS
Filed Sept. 6, 1955

INVENTOR.
GEORGE V. TAPLIN
BY
ATTORNEY.

United States Patent Office 2,858,447
Patented Oct. 28, 1958

2,858,447

RADIATION DOSIMETER AND DOSIMETRIC METHODS

George V. Taplin, Los Angeles, Calif., assignor to the United States of America as represented by the United States Atomic Energy Commission Application September 6, 1955, Serial No. 532,810

32 Claims. (Cl. 250—83)

The present invention relates, in general, to the determination of ionizing radiation quantities by chemical dosimetry and, more particularly, to the determination of such quantities by the use of a homogeneous aqueous fluid colorimetric composition containing a chlorinated hydrocarbon.

Due to the expanding developments in the atomic energy field, increasing use of accelerators and other radiation producing devices, and the needs of the civilian defense program, there exists a pressing need for portable and reliable dosimeters for measuring exposure to various kinds of radiation. Colorimetric dosimeters, employing fluid chlorinated hydrocarbons in the presence of an acidimetric dye and, optionally, in the presence of other titrimetric reagents, have previously been developed. In such systems, gamma and X-ray irradiation liberates acidic materials from the chlorinated hydrocarbons causing a color change in the acidimetric dye.

For example, U. S. Patent No. 2,700,736, issued January 25, 1955, to Newell O. Roberts, discloses the use of an aqueous alcoholic solution of chlorinated hydrocarbon, acidimetric dye and titrimetric reagents to measure X-ray and gamma radiation quantities. U. S. Patent No. 2,682,510, issued June 29, 1954, to George V. Taplin et al., discloses a colorimetric system including a chlorinated hydrocarbon phase in contact with an aqueous acidimetric dye phase for measuring such radiation while the copending application, Serial No. 387,556, filed August 13, 1953, by George V. Taplin et al., now Patent No. 2,848,625, issued August 19, 1958, relates to an improved two phase colorimetric system and apparatus employing a chlorinated hydrocarbon phase in contact with an aqueous acidimetric dye phase and in the presence of certain normalizing agents (e. g., alcohols) which make the system more stable and accurate under widely varying exposure conditions.

The primitive, classical reaction whereby acidic materials are evolved by chlorinated hydrocarbons on irradiation with X- and gamma rays has been known for a considerable period; however, the reaction kinetics have been little understood. Ordinarily chlorinated hydrocarbons, subjected to irradiation, particularly with gamma and X-rays, are dissociated, yielding chlorine in a nascent state. Provided that a source of hydrogen is present in the system a certain amount of HCl is produced and remains dissolved in the hydrocarbon and the amount can be determined later as by titration; however, in such a system very large amounts of radiation are required to produce easily measured amounts of acidity and acidity production is very erratic and dependent on irradiation conditions such as irradiation energy, temperature, rate, etc. Moreover, the chlorinated hydrocarbon is not stable and evolves acid merely on storage.

The reaction kinetics involved in the evolution of acid from chlorinated hydrocarbons is very complicated and is believed to involve a chain reaction which is very seriously influenced, under usual conditions, by even minor variations in irradiation conditions. Accordingly, irradiation with identical amounts of radiation under varied conditions produces highly variable amounts of acid, a situation obviously unsuited to dosimetric purposes. Decided improvements over the classical method have been obtained by employing advanced methods such as those disclosed in the aforesaid copending application and issued patents.

Now the formulation of new single phase colorimetric systems has been discovered whereby radiation quantities can be determined with even greater accuracy and under even more diverse conditions of exposure. In general, the novel single homogeneous fluid phase, colorimetric-dosimetric, systems of the invention comprise an aqueous phase having certain chlorinated hydrocarbons dissolved therein together with acidimetric reagents including pH indicator dyes and, optionally, other pH adjusting or buffering materials together wih normalizing reagents of the character noted above. These new dosimetric systems have an essentially flat spectral response with radiation of widely varying energy. Greater stability and sensitivity are obtained and a variety of methods have been perfected whereby the sensitivity is easily predetermined over an enormous range. Previous aqueous systems are not sensitive to irradiation levels below about 500–1000 r. while the present system can be employed even below about 10 r. Also, the sensitivity to fast neutron irradiation is greatly enhanced as compared with previous systems.

It is therefore an object of the present invention to provide new colorimetric chemical dosimetric systems and apparatus for determining energetic ionizing radiation quantities.

Another object of the invention is to provide a single phase chemical dosimetric composition which accurately indicates amounts of ionizing radiation impinging thereon under diverse exposure conditions.

Still another object of the invention is to provide a single phase colorimetric-dosimetric system comprising an aqueous phase having dissolved therein a chlorinated hydrocarbon together with a pH indicator dye.

One other object of the invention is to provide a single phase chemical dosimetric system comprising an aqueous phase having dissolved therein a chlorinated hydrocarbon together with a pH indicator dye and a normalizer agent, whereby radiation quantities may be accurately determined.

A further object of the invention is to provide a single-phase fluid chemical dosimeter which possesses a flat spectral response to radiation of widely varying energy and an adjustable high sensitivity to fast neutron irradiation, as well as to beta, gamma and X-ray radiation.

Other objects and advantages of the invention will become apparaent by consideration of the following description taken in conjunction with the accompanying drawing, of which:

Figure 2:
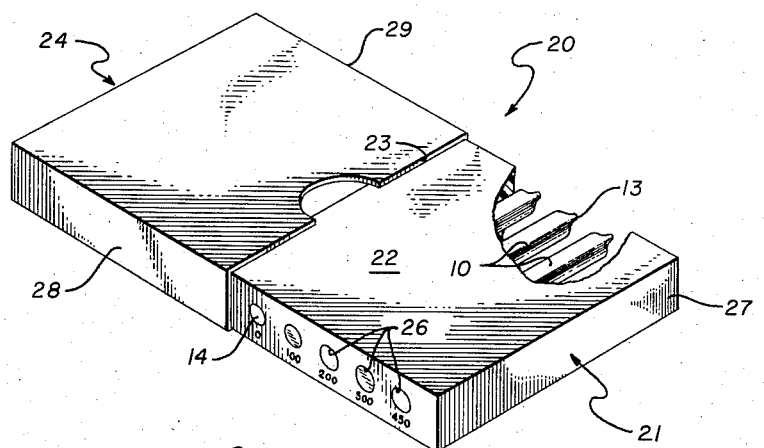
Figure 2 is a perspective view partially in section of a multicellular or multirange dosimeter in accordance with the invention.

In usual practice, for exposure purposes, fluid chemical dosimetric systems of a predetermined sensitivity are generally incorporated into appropriate ampules or vials and exposed either singly or as a group having sensitivities adjusted to cover an appropriate range of radiation quantities. It will be appreciated that exposure can be made in other containers and in other structural arrangements; however, for simplicity, the description will relate to the provision of such ampule systems which systems are generally termed "dosimeters."

In accordance with the present invention, the fluid sensitive element in such a dosimeter comprises a single homogeneous aqueous phase. Such aqueous phase is produced by dissolving a selected chlorinated hydrocarbon in water of requisite purity, generally to saturation. Normalizing agent, indicator dye and acidimetric reagents are then added to the aqueous phase in amounts determined as described more fully hereinafter. Upon irradiation, the chlorinated hydrocarbon is dissociated to produce acidic materials (probably HCl) in the system, eventually causing a color change, at a predetermined dosage level, somewhat similarly to the dosimetric systems disclosed in the aforesaid patents and copending application.

It will be appreciated that the color change occurs as a correlative change in pH of the system which change in pH is effected by the progressive liberation of HCl as the system is irradiated with neutrons or with beta, gamma or X-rays. The indicator dyes serve as pH indicators, and various increments of irradiation can be determined within the color-change range of the system dependent on the method of observing the color and by other methods. Dosage can be estimated approximately (i. e., within to about 15%) by visual comparison with color standards such as irradiated controls. More accurate determinations can be obtained by titration with base, e. g., $10^{-3}$ N NaOH, to the pre-exposure color and most accurately (i. e., within 2 to 5%) by spectrophotometric determination of color changes in the dye phase. Moreover, spectrophotometric methods provide the best method for selecting dosimeters having the proper initial sensitivity range, especially for more accurate determinations.

Accordingly, several methods are contemplated in the invention for utilizing the dosimetric systems. For some purposes unicellular dosimeters may be employed whereby an observable color change indicates exposure to a minimum level of irradiation, for example, in irradiation therapeusis, food and drug sterilization, monitor activities, etc. For other purposes a series of unicellular dosimeters having appropriate sensitivity ranges may be used as a group to indicate dosages or exposures to unknown amounts of irradiation within narrow minimum and maximum limits. Such multicellular dosimeters can therefore be employed as personal dosimeters as required in civil defense activities and the like.

The overall sensitivity of the present system is dependent on several factors including purity of the reagents, the particular chlorinated hydrocarbon employed, the indicator dye employed and the concentration thereof, initial pH of the system and, to some extent, the observation characteristics of the container as well as other factors noted hereinafter. Accordingly, control and/or adjustment thereof permits adjustment of the sensitivity or radiation indication level of the colorimetric change in the system.

In practice it has been found most convenient to standardize such factors as the purity of the reagents, containers, and several other factors and to adjust the sensitivity of the system by selection of the particular indicator dye, chlorinated hydrocarbon, normalizer and concentrations of the dye and normalizer. Control of the normalizer concentration provides a preferred method of adjusting the sensitivity. Sensitivity is increased by using more dilute indicator dye solutions and the selection of dyes which have a pH color indicating range including neutrality (pH 7.0) as noted below. Basic substance (NaOH) can also be included with the indicator dye to adjust the initial pH and, therefore, the sensitivity range.

In preparing the aqueous phase of the higher range dosimetric system in accordance with the invention, reasonably pure water is usually satisfactory. However, with systems of below about 500 r colorimetric response, conductivity water or water of equivalent high purity must generally be employed for best results. $CO_2$ contamination has an increasingly serious effect as the sensitivity of the system is increased, especially when operating with a pH near neutrality (pH 7.0). Therefore, for the more sensitive systems all preparative operations should be conducted in a $CO_2$ free atmosphere such as nitrogen and with $CO_2$-free reagents to avoid contamination with $CO_2$.

A wide variety of chlorinated hydrocarbons can be employed in the single phase system of the invention. As a primary consideration, it will be appreciated that the material must be soluble to some extent in water to provide an effective concentration thereof in such phase. Chlorinated hydrocarbons and especially fluid chlorinated aliphatic hydrocarbons, such as carbon tetrachloride, chloroform and ethylene dichloride, which have previously been employed in the two phase systems described above can be so employed; however, remarkable advantages have been obtained in the present system using trichloroethylene. This material yields relatively large amounts of acid on irradiation and therefore the sensitivity of the system is increased. Certain other sensitive materials, i. e., trichloroethane and tetrachloroethylene should behave similarly. The sensitivities of systems prepared with various chlorinated hydrocarbons will differ; however, with all other variables being constant, the sensitivities will be found to follow parallel curves at corresponding levels. As previously employed in two phase dosimetric systems, the above-mentioned extra-sensitive materials often were not found applicable due to narrow temperature stability ranges and other undesirable characteristics. In the present system such difficulties have been eliminated.

When purification is necessary the chlorinated hydrocarbon is water washed and multiply distilled. A constant boiling or narrow boiling midfraction is collected, as beneath mildly alkaline dye phase, and used in the preparation of the aqueous phase. To effect the latter preparation the purified water is intimately contacted with the aqueous phase to produce a saturated solution of the chlorinated hydrocarbon therein. With this method of preparation, at a standard temperature, a constant ratio of hydrocarbon to water is obtained.

Certain pH indicator dyes, which undergo a color change at a pH in a range bracketing or near neutrality, viz., phenol red, chlorphenol red, bromcresol purple, neutral red and cresol red have been found most satisfactory in practice and are therefore preferred. They are introduced into the aqueous phase by various methods. For example, it has been found most convenient to prepare a concentrated, $CO_2$-free, aqueous solution of the indicator dye or such a solution adjusted to an appropriate pH with NaOH and then to prepare the aqueous phase by dilution of the dye solution with the chlorinated hydrocarbon saturated water. The concentration of dye (and base) is varied as described below, in conjunction with other determining variables, to adjust the gross sensitivity of the system. In any event to prepare the more sensitive aqueous phases, using dyes having an end point near neutrality, careful techniques such as preparation of reagents in $CO_2$-free atmospheres (nitrogen) are essential. These indicator dyes are employed in amounts ranging down into the very dilute ranges, wherein the buffering effect is not significant, for the most sensitive systems, and up into more concentrated ranges, i. e., high radiation dose ranges, wherein the buffering effect is used effectively.

A normalizer agent is included as an essential component in the system to obtain the best results. The beneficial behavior of such normalizing agents, in two phase dosimetric systems, has been previously disclosed in the aforesaid copending application. In general, the normalizing agents as disclosed therein are, characteristically, alcohols, phenols and cresols. For the present purpose, it is preferred to utilize the more effective normalizers such as resorcinol, geraniol, meta cresol, α-tocopherol, and α-napthol to permit realization of the full advantages of the invention. Of these more effective normalizers, resorcinol has been found to yield superior results. Varying amounts are employed to effect the normalization (or linearization) and stabilization of the system under irradiation and storage conditions and to serve, advantageously, as a fine sensitivity control. Amounts ranging below thousandths of a percent exert a noticeable effect and amounts as high as several percent are used with high range instruments.

The chain reaction, induced by the incident radiation and which results in the liberation of the acid, is very rigidly controlled by the composition of the system, especially by the presence of the normalizer and the very large concentration of water in the system. It is considered that the water acts as a stabilizing agent as well as serving as the solvent which provides the necessary environment for the dyes, etc. In theory, it is believed that each chlorinated hydrocarbon molecule in the system is surrounded by many water molecules which act as thermo-stabilizing agents. Accordingly, even very thermo-labile chlorinated hydrocarbons are thermo-stabilized to a remarkable degree allowing these materials, which are usually more radiation sensitive, to be effectively utilized.

Due to the low yield of acid, i. e., G values of about 10 to 20, it is considered that the chain reaction, as controlled by the determining conditions in the present system, is characterized as being very short. Accordingly, material differences are noted in the behavior of the present system as contrasted with the prior two-phase and single-phase systems in at least the following salient points:

(1) The present systems are tremendously less affected by wide variations in the concentration of the normalizer.

(2) Impurities in the chlorinated hydrocarbons used herein are less important and purification, e. g., of commercial materials, in many instances is unnecessary. Moreover water purity is not critical except in low range instruments and the use of low conductivity water is unnecessary with high range instruments.

(3) The dosage indication by the single phase system is substantially unaffected by changes in irradiation conditions. For example, the same amount of acid is liberated per unit of soft and hard gamma, X-ray and beta radiation (at least in the range of 40 to 12,000 kv.) with tremendous variation in dosage rate (at least 1.0 to 1,050 r./min.); and with wide variation in temperature of the system during irradiation (0° to 52° C.).

(4) The density of the single phase system is very close to that of water (1.0) and tissue juice whereby there is a direct biological equivalence as contrasted with two-phase systems having a density of 1.5 or greater.

(5) The single phase systems are relatively more sensitive to fast neutron irradiation, i. e., by factors of 3 to 6, over two-phase systems. Apparently, this is due to the higher hydrogen content of the system.

(6) The container material is not critical in the present case and therefore various plastics such as polyethylene, Kel F, polystyrene and borosilicate glass can be used as the containers. The most sensitive systems may use silicone treated borosilicate glass prepared as disclosed in the aforesaid copending application to some advantage.

(7) Two-phase resorcinol stabilized dosimeters of the improved variety disclosed in the aforesaid copending application of George V. Taplin et al., have a shelf life of 12 to 18 months at temperatures below 100° F. However, at 120° F., the period is reduced to two weeks and at boiling temperature, to only 4 or 5 minutes. Single phase dosimeters such as trichloroethylene saturated $CO_2$-free aqueous phase containing phenol red indicator dye and resorcinol are unaffected after boiling for more than 5 hours. Therefore, the shelf life should be indefinite, even if temperatures exceed 120° F. for relatively long periods.

In connection with the use of plastic as a container, it should be noted that this factor allows beta radiation to be measured since very little of the hard beta radiation is shielded by the plastic as compared with glass. The measurement of skin beta or beta-gamma exposure dosages is thereby greatly facilitated since the plastic container can be used in skin-equivalent thicknesses thereby eliminating the necessity of making correction for beta rays exceeding 0.7 m. e. v.

The term "dosimeter" as employed herein may apply to either a unicellular or single ampule enclosed colorimetric system or may apply to a multicellular array of such unicellular systems wherein the individual cellular systems are of various sensitivities. Single cell systems can be employed, for example, to determine standard dosages of irradiation while the multicellular type are suitable for determining exposure to unknown amounts of irradiation as required in monitor-personnel area survey, or personal dosimetry.

Figure 1:
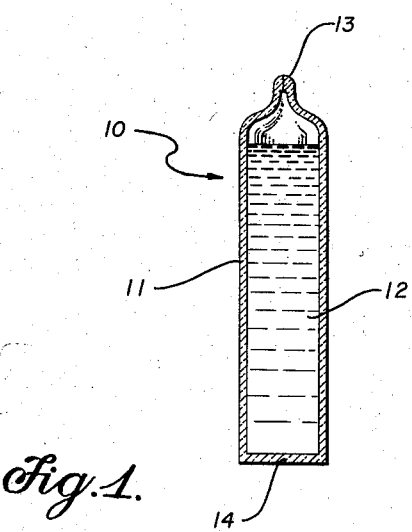
Figure 1 is an elevational view of a unicellular dosimeter.

The physical structure of a unicellular dosimeter 10 is shown in Fig. 1 of the drawing, and comprises an elongated tubular container portion 11 formed of a rigid or semi-rigid transparent material of the character described above. A radiation-sensitive homogeneous fluid colorimetric phase 12, prepared as disclosed elsewhere in the specification, is disposed in the container 11 and the latter is flame sealed at neck 13 with a microjet gas-oxygen burner immediately after flushing the neck 13 with pure nitrogen gas for a few minutes to displace any of phase 12 adhering thereto. To provide a more sensitive and accurate observation of the colorimetric phase 12, the length of the tubular container is, preferably, considerably elongated whereby the accentuated color of a greater length of fluid is observable through the transparent base 14 of the container 11. In the event that the dosimeter 10 is disposed in an opaque enclosure, e. g., in a cylindrical housing (not shown) for protection, illumination should be provided to facilitate observation.

An array of such unicellular dosimeters 10 are disposed in a suitable housing, as shown in Fig. 2 of the drawing, to provide the multicellular dosimeter 20. As illustrated therein, the dosimeter 20 includes a core assembly 21, consisting of a plurality of dosimeter cells 10, disposed within a rectangular block core retainer 22, which is slideable into the open side 23 of a case 24. Case 24 is generally fabricated of thin plastic in a flattened hollow rectangular form adapted to fit conveniently into a pocket, etc.

The retainer case 22 is conveniently molded of plastic with a series of channels or cubicles 26 paralleling one of the major length dimensions of the rectangular form to receive the dosimeter cells 10. Preferably, the cubicles 26 are oriented so as to parallel an exterior narrow side 27, of the core retainer, which closes the open side 23 of the case 24. Accordingly, the closed sides 28 and 29 of the case 24 retain the dosimetric cells 10 in the cubicles 26 when the core assembly 21 is slid into the case 24. In the open position the color of the dosimeters is immediately observable through the transparent bases 14 thereof.

The manipulative operations, generic compositions and general calibration and exposure procedures employed in producing and utilizing dosimeters have been indicated in the foregoing. Further details of the invention will now be disclosed with reference to representative and preferred examples of single phase dosimetric compositions together with methods of production and use associated therewith.

EXAMPLE I

Trichloroethylene saturated $CO_2$-free single homogeneous fluid phase compositions were prepared as described above. Various proportions, i. e., percentages, of a stock solution prepared by dissolving 400 mgm. of crystalline colorimetric dye in conductivity water were then added together with selected amounts of resorcinol to obtain dosimeters having sensitivities in the ranges and under the optimal conditions indicated in the following table:

*Specifications for single-phase trichloroethylene-dye dosimeters*

| Ampule Length | Dimensions Diameter, millimeters | Chemical, Percent Dye | Ingredients, Percent Resorcinol | Dose Range (roentgens) |
|---|---|---|---|---|
| 4½″ | 6 | 0.025 PR [1] | None | 0–100 |
| 4½″ | 6 | 0.025 PR | 0.001 | 100–450 |
| 3″ | 7 | 0.05 PR | 0.001 | 100–450 |
| 2½″ | 7 | 0.2 CPR [2] | 0.001 | 70–700 |
| 2½″ | 7 | 0.5 CPR | 0.002 | 150–1,500 |
| 2½″ | 7 | 0.5 CPR | 0.01 | 250–2,500 |
| 2½″ | 7 | 0.5 CPR | 0.05 | 500–5,000 |
| 2½″ | 7 | 0.5 CPR | 0.10 | 1,000–10,000 |
| 2½″ | 7 | 0.5 CPR | 1.00 | 10,000–100,000 |

[1] Aqueous phenol red. Strength given is in percent of a stock solution made by dissolving 400 mgm. of crystalline dye in 100 ml. of conductivity water.
[2] Aqueous chlorophenol red. Strength is in percent of a stock solution made in the same manner as for phenol red.

The observations of color change were made with reference to color standards. With these dosimeters gamma radiation exposures in 10 r. increments in the 0 to 100 r. dose range were easily determined. These high sensitivity dosimeters represent about the maximum sensitivity which can be expected in practice. Illustratively, the pH of the dosimetric solution was reduced 7.8 to 6.8 on exposure to a 100 r. dose of $Co^{60}$ gamma rays. The dose range of 0 to 500 r. is best covered by using $CO_2$-free phenol red indicator dye. Higher range instruments, i. e., 500–100,000 r. were readily prepared using chlorophenol red indicator dye. The sensitivity was adjusted by adding resoriconal as indicated. As the sensitivity range of the doosimeter was increased, accuracy of the reading improved. For example, systems designed to register 10,000 r. and adjusted to pH 10 initially and which registered the total dose with a drop in pH to a value of 7, the major change occurred in the last 100 r. (correlative with an acidity increase over a range of from pH 8 to pH 7).

EXAMPLE II

A standard series of chlorfrom saturated single homogeneous phase dosimeters containing bromcresol indicator dye and an identical series having 0.002% resorcinol added thereto were irradiated at widely varying rates. Subsequently, the fluid of each dosimeter was titrated with base to determine the yield of acid per ml. of dosimeteric phase per roentgen of radiation under the conditions and with the results indicated in the following table:

*Effect of varying the dosage rate on acid production from single-phase chloroform-dye systems*

| Dosimeter System | Radiation Yield in Meq. Acid × $10^{-6}$/ml./r. When Irradiated at Different Rates | | | | |
|---|---|---|---|---|---|
| | 5 r./min. | 30 r./min. | 75 r./min. | 300 r./min. | 1,200 r./min. |
| 1. Chloroform-saturated aqueous Bromcresol purple | 0.025 | 0.025 | 0.025 | 0.023 | 0.018 |
| 2. Same as above, but stabilized with 0.002% Resorcinol | 0.018 | 0.018 | 0.018 | 0.018 | 0.018 |

Notes.—Each value represents the average from titrating 20 separate dosimeter samples.
Radiation sources: (a) 300 mgm. radium for 5 r./min. rate; (b) 70 Curie $C^{060}$ for 30 to 1200 r./min. rates.

As may be noted, in the absence of the resorcinol, the acid yield decreases as the irradiation rate increases. Identical amounts of acid are produced in the presence of the resorcinol, in the range indicated and, likewise, to much greater levels. Furthermore, the single phase systems yield consistent results which correlate with the results obtained by the use, e. g., of NBS film packs and other accepted gauges when exposed to nuclear bomb explosions (i. e., when irradiated at tremendous rates).

EXAMPLE III

Two series of dosimetric compositions similar to those of Example II were subjected to irradiation with X and gamma rays of widely varying energies and the acid production determined as in Example II, under the conditions and with the results tabulated below. As may be noted from the table the addition of the resorcinol renders the sensitivity of the system independent of variable radiation energy and rate effects.

*Effect of varying the effective energy of X and gamma radiation on acid formation from single-phase chloroform-dye systems*

| Dosimeter Systems | Radiation Yield in Meq. Acid × $10^{-6}$/ml./r. at Different Mean Effective Energies | | | |
|---|---|---|---|---|
| | 35 kv. | 80 kv. | 160 kv. | 1,200 kv. |
| 1. Chloroform-saturated aqueous Bromcresol purple | 0.025 | 0.024 | 0.023 | 0.025 |
| 2. Same as above, but stabilized with 0.002% Resorcinol | 0.018 | 0.018 | 0.018 | 0.018 |

Notes.—Radiation rates varied from 30 r./min. to 300 r./min. Each value is the mean from titrating 20 separate dosimeter ampules. Radiation factors: (a) 35 kv. effective, 85 kv. p. X-ray unit operated at 75 kv. p., 5 ma., using 60 mm. Al filtration; (b) 80 kv. effective, 250 kv. p. X-ray unit operated at 15 ma., 150 kv. p. using 0.28 mm. Cu and 1.0 mm. Al filtration; (c) 160 kv. effective, 250 kv. p. X-ray unit operated at 250 kv. p. at 15 ma., using 0.28 mm. Cu and 1.0 mm. Al filtration; (d) 1200 kv. p. effective, $Co^{60}$ source.

EXAMPLE IV

Two series of dosimetric compositions prepared as in the preceding examples and contained in flame sealed, 2 ml., 10.0 mm. diameter Kimble Neutraglass ampules were irradiated at various temperatures, while being half submerged in a constant temperature bath, with the results and under the conditions indicated in the following table. The samples were selected spectrophotometrically to have an initial pH value at 6.0. The values shown are the mean obtained by titrating 20 separate samples. It can be seen from the table that the response of the stabilized system remains relatively constant.

*Effect of varying the temperature during irradiation on acid production from single-phase chloroform-dye systems*

| Dosimeter System | Radiation Yield in Meq. Acid × $10^{-6}$/ml./r. When Irradiated at Different Temperature | | | |
|---|---|---|---|---|
| | 2° C. | 20° C. | 34° C. | 52° C. |
| 1. Chloroform-saturated aqueous Bromcresol purple | 0.020 | 0.025 | 0.027 | 0.027 |
| 2. Same as above, but stabilized with 0.002% Resorcinol | 0.017 | 0.018 | 0.020 | 0.019 |

Notes.—Radiation factors:
(a) 250 kv. p. X-rays operated at 15 ma.
(b) Dosage rate of 300 r./min.
(c) HVL of beam 1.00 mm. copper.
(d) Total dosage 5,000 r. Dosimeters irradiated while half submerged in water bath held at constant temperature.

EXAMPLE V

A series of single phase dosimeters having appropriate sensitivity ranges and utilizing chloroform saturated aqueous phase with bromcresol purple acidimetric dye and a series of two phase dosimeters of the improved type disclosed in the aforesaid copending application of George V. Taplin et al., and which possessed a comparable X and gamma ray sensitivity, were subjected, under comparable conditions, to irradiation with neutrons produced from a Be target in a cyclotron. The two phase system comprised a trichloroethylene phase in contact with a bromcresol purple aqueous dye phase. Other conditions and results appear in the following table, wherefrom it is apparent that the single phase systems of the present invention have a neutron sensitivity increased about fivefold over two phase systems having comparable X and gamma ray sensitivity. Moreover, the results indicate that both systems register exposure values which closely follow the inverse square law, i. e., of distance between source and dosimeter.

*Neutron-dose distance response of chemical dosimeters upon exposure to neutrons produced in a 60-inch cyclotron*

| Neutron Dose in rep. | Axial Distance from Be Target in inches | Estimated Gamma Contamination in Roentgens | Neutron Response of Chemical Dosimeters in r. Corrected for 10% Gamma Contamination | |
|---|---|---|---|---|
| | | | Single Phase Systems | Two-Phase Systems |
| 10,100 | 10 | | $ChCl_3$—BCP     4,625 | TCE—BCP     900 |
| 3,950 | 15 | | $ChCl_3$—BCP     2,125 | TCE—BCP     400 |
| 2,100 | 20 | | $ChCl_3$—BCP     1,100 | TCE—BCP     250 |
| 935 | 30 | 100 | $ChCl_3$—BCP       550 | TCE—BCP      85 |
| 10,600 | 10 | | $ChCl_3$—BCP     4,737 | |
| 4,090 | 15 | | $ChCl_3$—BCP     2,280 | |
| 2,390 | 20 | | $ChCl_3$—BCP     1,000 | |
| 985 | 30 | 100 | $ChCl_3$—BCP       425 | |

*Notes.*—Values shown for chemical dosimeters represent the averages from 3 to 5 separate dosimeters of each type exposed simultaneously along with sulphur dosimeters.
Gamma contamination estimated to be about 100 r., or 10% of the neutron dose at 30 inches. Neutron dose in rep. based on $2.0 \times 10^8$ $N/cm.^2 = 1.0$ rep.

While the invention has been described with reference to preferred embodiments, modifications will be apparent to those skilled in the art and it is intended to cover all such as fall within the scope of the appended claims.

What is claimed is:

1. A single fluid phase colorimetric composition for indicating exposure to ionizing radiation comprising water having a chlorinated hydrocarbon and an acidimetric dye dissolved therein, said water serving to stabilize the chlorinated hydrocarbon and providing the environment for the colorimetric response to said radiation.

2. A single fluid phase colorimetric composition for indicating exposure to ionizing radiation comprising water having dissolved therein a fluid aliphatic chlorinated hydrocarbon and an acidimetric dye of the class which undergoes a color change near neutrality on a correlative increase in acidity with irradiation of the composition, said water serving to stabilize the chlorinated hydrocarbon and providing the environment for the colorimetric response to said radiation.

3. A single fluid phase colorimetric composition for indicating exposure to ionizing radiation comprising water having dissolved therein a fluid aliphatic chlorinated hydrocarbon and an acidimetric dye selected from the groups consisting of phenol red, chlorphenol red, bromcresol purple, neutral red and cresol red, said water serving to stabilize the chlorinated hydrocarbon and providing the environment for the colorimetric response to said radiation.

4. A single fluid phase colorimetric composition for indicating exposure to ionizing radiation comprising water having dissolved therein a chlorinated hydrocarbon selected from the group consisting of carbon tetrachloride, chloroform, ethylene dichloride, trichloroethylene, trichloroethane and tetrachloroethylene and an acidimetric dye selected from the group consisting of phenol red, chlorphenol red, bromcresol purple, neutral red and cresol red, said water serving to stabilize the chlorinated hydrocarbon and providing the environment for the colorimetric response to said radiation.

5. A single fluid phase colorimetric composition for indicating dosages or exposure to ionizing radiation comprising water having a chlorinated hydrocarbon, an acidimetric dye and a normalizer agent selected from the group consisting or resorcinol, geraniol, meta cresol, $\alpha$-tocopherol and $\alpha$-naphthol dissolved therein.

6. A single fluid phase colorimetric composition for indicating dosages or exposure to ionizing radiation comprising water having dissolved therein a fluid aliphatic chlorinated hydrocarbon, an acidimetric dye of the class which undergoes a color change near neutrality on a correlative increase of acidity on irradiation of the composition and a normalizer agent selected from the group consisting of resorcinol, geraniol, meta cresol, $\alpha$-tocopherol and $\alpha$-naphthol.

7. A single fluid phase colorimetric composition for indicating dosages or exposure to ionizing radiation comprising water having dissolved therein a fluid aliphatic chlorinated hydrocarbon, an acidimetric dye selected from the group consisting of phenol red, chlorphenol red, bromcresol purple, neutral red and cresol red and a normalizer agent selected from the group consisting of resorcinol, geraniol, meta cresol, $\alpha$-tocopherol and $\alpha$-naphthol.

8. A single fluid phase colorimetric composition for indicating dosages or exposure to ionizing radiation comprising water having dissolved therein a chlorinated hydrocarbon selected from the group consisting of carbon tetrachloride, chloroform, ethylene dichloride, trichloroethylene, trichloroethane and tetrachloroethylene and an acidimetric dye selected from the group consisting of phenol red, chlorphenol red, bromcresol purple, neutral red and cresol red and a normalizer agent selected from the group consisting of resorcinol, geraniol, meta cresol, $\alpha$-tocopherol and $\alpha$-naphthol.

9. A single homogeneous fluid colorimetric composition for indicating exposure to or dosages of ionizing radiation comprising a saturated solution of a fluid aliphatic chlorinated hydrocarbon in water, said solution having dissolved therein an acidimetric dye together with a normalizer selected from the group consisting of resorcinol, geraniol, meta cresol, $\alpha$-tocopherol and $\alpha$-naphthol, and titrimetric materials to adjust the initial pH thereof and cooperate in determining the sensitivity range of the system.

10. The composition as defined in claim 9 wherein said chlorinated hydrocarbon is selected from the group consisting of carbon tetrachloride, chloroform, ethylene dichloride, trichloroethylene, trichloroethane and tetrachloroethylene.

11. The composition as defined in claim 9 wherein said chlorinated hydrocarbon is selected from the group consisting of carbon tetrachloride, chloroform, ethylene dichloride, trichloroethylene, trichloroethane and tetrachloroethylene, and said acidimetric dye is selected from the group consisting of phenol red, chlorphenol red, bromcresol purple, neutral red, and cresol red.

12. A composition as defined in claim 11 but wherein said chlorinated hydrocarbon comprises trichloroethylene.

13. The composition as defined in claim 11 but wherein said chlorinated hydrocarbon comprises chloroform.

14. The composition as defined in claim 11 wherein said chlorinated hydrocarbon comprises trichloroethane.

15. The composition as defined in claim 11 wherein said chlorinated hydrocarbon comprises tetrachloroethylene.

16. A unicellular dosimeter for colorimetrically indicating exposure to or dosages of X-ray, gamma, beta and neutron irradiation comprising a sealed transparent ampule, and a homogeneous fluid single phase composition disposed in said ampule, said composition comprising water having a chlorinated hydrocarbon and an acidimetric dye dissolved therein, said water serving to stabilize the chlorinated hydrocarbon and providing the environment for the colorimetric response to said radiation.

17. A unicellular dosimeter for colorimetrically indicating exposure to or dosages of X-ray, gamma, beta and neutron irradiation comprising a sealed transparent ampule, and a homogeneous fluid single phase composition disposed in said ampule, said composition comprising water having dissolved therein a chlorinated hydrocarbon selected from the group consisting of carbon tetrachloride, chloroform, ethylene dichloride, trichloroethylene, trichloroethane and tetrachloroethylene and an acidimetric dye selected from the group consisting of phenol red, chlorophenol red, bromcresol purple, neutral red and cresol red.

18. A unicellular dosimeter for colorimetrically indicating exposure to or dosages of X-ray, gamma, beta and neutron irradiation comprising a sealed transparent ampule, and a homogenous fluid single phase composition disposed in said ampule, said composition comprising water having dissolved therein a chlorinated hydrocarbon, an acidimetric dye and a normalizer agent selected from the group consisting of resorcinol, geraniol, meta cresol, α-tocopherol and α-naphthol.

19. A multicellular or multirange dosimeter for colorimetrically indicating exposure to or dosages of X-ray, gamma, beta and neutron irradiation comprising a case portion, a retainer core portion adapted to repose in said case and provided with a plurality of receptacle cubicles, and a plurality of unicellular dosimeters disposed in said cubicles, said unicellular dosimeters being of varying sensitivities and comprising a sealed transparent ampule, and a homogeneous fluid single phase composition disposed in said ampule, said composition comprising water having dissolved therein a chlorinated hydrocarbon and an acidimetric dye, said water serving to stabilize the chlorinated hydrocarbon and providing the environment for the colorimetric response to said radiation.

20. A multicellular or multirange dosimeter for colorimetrically indicating exposure to or dosages of X-ray, gamma, beta and neutron irradiation comprising a case portion, a retainer core portion adapted to repose in said case and provided with a plurality of receptacle cubicles, and a plurality of unicellular dosimeters disposed in said cubicles, said unicellular dosimeters being of varying sensitivities and comprising a sealed transparent ampule, and a homogeneous fluid single phase composition disposed in said ampule, said composition comprising water having dissolved therein a chlorinated hydrocarbon selected from the group consisting of carbon tetrachloride, chloroform, ethylene dichloride, trichloroethylene, trichloroethane and tetrachloroethylene and an acidimetric dye selected from the group consisting of phenol red, chlorphenol red, bromcresol purple, neutral red and cresol red.

21. A multicellular or multirange dosimeter for colorimetrically indicating exposure to or dosages of X-ray, gamma, beta and neutron irradiation comprising a case portion, a retainer core portion adapted to repose in said case and provided with a plurality of receptacle cubicles, and a plurality of unicellular dosimeters disposed in said cubicles, said unicellular dosimeters being of varying sensitivities and comprising a transparent ampule, a stopper closing said ampule, and a homogeneous fluid single phase composition disposed in said ampule, said composition comprising water having dissolved therein a chlorinated hydrocarbon, an acidimetric dye selected from the group consisting of phenol red, chlorphenol red, bromcresol purple, neutral red and cresol red, and an alcoholic normalizer selected from the group consisting of resorcinol, geraniol, meta cresol, α-tocopherol and α-naphthol.

22. The composition as defined in claim 9, wherein said chlorinated hydrocarbon comprises trichloroethylene.

23. The composition as defined in claim 9 wherein said chlorinated hydrocarbon comprises trichloroethylene and said normalizer comprises resorcinol.

24. The composition as defined in claim 9 wherein said chlorinated hydrocarbon comprises chloroform.

25. The composition as defined in claim 9 wherein said chlorinated hydrocarbon comprises chloroform and said normalizer comprises resorcinol.

26. The composition as defined in claim 11, wherein said chlorinated hydrocarbon comprises carbon tetrachloride.

27. A dosimeter as defined in claim 16 wherein said chlorinated hydrocarbon comprises trichloroethylene and said acidimetric dye comprises about 0.025% phenol red, whereby said dosimeter has a dosage range of about 0–100 roentgens.

28. A dosimeter as defined in claim 18 wherein said chlorinated hydrocarbon comprises trichloroethylene, said acidimetric dye comprises about 0.025 to 0.05% of phenol red, and said normalizer comprises about 0.001% of resorcinol, whereby said dosimeter indicates dosages in the range of about 100–450 roentgens.

29. A dosimeter as defined in claim 18 wherein said chlorinated hydrocarbon comprises trichloroethylene, said dye comprises about 0.2 to 0.5% chlorphenol red and said normalizer comprises about 0.001 to 1.0% of resorcinol, whereby said dosimeter indicates dosages in the range of about 70 to 100,000 roentgens.

30. The dosimeter as defined in claim 18 wherein said chlorinated hydrocarbon comprises chloroform, said acidimetric dye comprises bromcresol purple and said normalizer comprises resorcinol.

31. A homogeneous fluid single phase colorimetric composition for indicating dosages of ionizing radiation comprising a saturated solution of a fluid aliphatic chlorinated hydrocarbon in water, said solution having also dissolved therein an acidimetric dye and a water soluble hydroxy-substituted organic compound which compound stabilizes the composition and linearizes the acidity production response of said composition on irradiation.

32. The dosimeter as defined in claim 16 wherein said ampule is constructed of plastic in skin equivalent thicknesses, whereby dosage correction for beta rays exceeding 0.7 m. e. v. is eliminated.

References Cited in the file of this patent

UNITED STATES PATENTS

| | | |
|---|---|---|
| 2,682,510 | Taplin et al. | June 29, 1954 |
| 2,700,736 | Roberts | Jan. 25, 1955 |